United States Patent
Machulsky et al.

(10) Patent No.: US 7,865,697 B2
(45) Date of Patent: Jan. 4, 2011

(54) APPARATUS FOR AND METHOD OF PROCESSOR TO PROCESSOR COMMUNICATION FOR COPROCESSOR FUNCTIONALITY ACTIVATION

(75) Inventors: Zorik Machulsky, Gesher HaZiv (IL); Julian Satran, Atlit (IL); Leah Shalev, Zichron-Yaakov (IL); Michael Steven Siegel, Raleigh, NC (US); Gregory Scott Still, Raleigh, NC (US); James Xenidis, Carmel, NY (US)

(73) Assignee: International Business Machines Corporation, Armonk, NY (US)

( * ) Notice: Subject to any disclaimer, the term of this patent is extended or adjusted under 35 U.S.C. 154(b) by 382 days.

(21) Appl. No.: 12/037,948

(22) Filed: Feb. 27, 2008

(65) Prior Publication Data

US 2009/0216998 A1 Aug. 27, 2009

(51) Int. Cl.
*G06F 15/76* (2006.01)
*G06F 15/80* (2006.01)

(52) U.S. Cl. .......................................... 712/34; 712/36
(58) Field of Classification Search .................. 712/34, 712/36
See application file for complete search history.

(56) References Cited

U.S. PATENT DOCUMENTS

| | | | |
|---|---|---|---|
| 6,085,314 A * | 7/2000 | Asghar et al. ............... | 712/213 |
| 6,338,108 B1 * | 1/2002 | Motomura ................... | 710/110 |
| 7,600,096 B2 * | 10/2009 | Parthasarathy et al. ........ | 712/34 |
| 2005/0172104 A1 * | 8/2005 | Lescure et al. ................ | 712/34 |

* cited by examiner

*Primary Examiner*—Daniel Pan

(57) ABSTRACT

A mechanism enabling a processor in a multiprocessor complex to function as a coprocessor to execute a specific function. The method includes a mechanism for activating a coprocessor to function as a coprocessor as well as a mechanism to execute a coprocessor request on the system. The present invention also provides a mechanism for efficient processor to processor communication for processors coupled to a common bus. Overall system performance is enhanced by significantly reducing the use of hardware interrupts for processor to processor communication.

20 Claims, 4 Drawing Sheets

APPARATUS FOR AND METHOD OF PROCESSOR TO PROCESSOR COMMUNICATION FOR COPROCESSOR FUNCTIONALITY ACTIVATION

FIELD OF THE INVENTION

The present invention relates to the field of process to process communications and more particularly relates to a mechanism for assigning the execution of a specific function to a processor in a multiprocessor environment.

BACKGROUND OF THE INVENTION

Implementing separate complex computational units to enhance computational capabilities beyond a computer's basic processing element's sole capabilities is a technique commonly implemented in previous and current computer architectures. Dedicated hardware coprocessors are commonly used to increase performance in areas such as floating point calculation, data input/output (I/O) and graphics. Historical implementations of utilizing such coprocessors include the Execute instruction in the International Business Machines (IBM) 360 mainframe, the X87 floating point escape codes in the early versions of the Intel X86 machines and other escape codes commonly implemented in both minicomputers and microprocessors.

Those aforementioned implementations are mostly characterized by the explicit addressing of a function of a coprocessing unit, a synchronous execution path and an implicit pairwise relationship between the main-processor and its coprocessor. A notable exception to this was the IBM 360 mainframe's implementation of channels to interface peripherals to the system. A channel acted as a coprocessor which executed input/output programs in an asynchronous manner and enabled the main processor to address coprocessors (i.e. the channel).

A block diagram of an example prior art system implementing coprocessors is shown in FIG. 1. The computer system, generally referenced 10, comprises central processing unit (CPU) 12, math coprocessor 14, I/O coprocessor 16, bus 18 and random access memory (RAM) 19. CPU 12 executing a program residing in RAM 19 can offload floating point calculations to math coprocessor 14 via system bus 18. I/O processing, such as disk I/O can also be offloaded from CPU 12 to I/O coprocessor 16.

Processor to processor communications is generally handled via hardware interrupts. A hardware interrupt causes the processor to save its state of execution via a context switch, and begin execution of an interrupt handler. An inefficiency of interrupts is that the processor suspends operation for the period of the interrupt. Additional issues currently affecting inter-processor communication is synchronization which is handled by implementing mechanisms such as locks. Implementing locks is both time consuming and causes an increase in traffic on the bus.

The widespread use of multi-core architectures in contemporary processors has raised new issues related to the inter-processor communication. Since the relationship between main processors to coprocessors is many-to-many, some additional functionality has been added to the coprocessor access functions such as isolation of access (accesses do not get intermixed) and a primitive form of serializability to allow isolation.

Some additional features allow coprocessor selection to be performed automatically (to ease the scheduling burden) and asynchronous execution allows for main processors and coprocessors to execute their tasks at different speeds. The architectural structure, however, has remained asymmetrical, with the main processor issuing an instruction to a coprocessor which then executes the instruction, delivers the results and signals termination.

SUMMARY OF THE INVENTION

The present invention provides a solution to the prior art problems discussed hereinabove by providing a processor to processor communication mechanism operative to facilitate inter-processor communication via the transmission and reception of bus transactions between two processors coupled to a common bus. Performance of the processor to processor communication mechanism of the present invention is enhanced by removing the requirement of using inefficient mechanisms such as interrupts in order to facilitate an event request, in this case a coprocessor activation request.

The present invention also provides a coprocessor activation mechanism which enables any processor in a multiprocessor complex to be the target of a coprocessor instruction. All processors in the multiprocessor complex are able to act as either issuers or receivers of coprocessor instructions, accommodating both many-to-many (maintaining isolation and serializability) and asynchronous operations between the processors. The coprocessor activation mechanism of the present invention enables a coprocessor function to be implemented in software, instead of using specialized hardware.

The invention is operative to enhance the performance of multiprocessor systems. Computationally intensive functions can be offloaded to specific processors as needed to take advantage of computers with a multiprocessor architecture. In addition, general processor to processor communications will benefit as well.

Note that some aspects of the invention described herein may be constructed as software objects that are executed in embedded devices as firmware, software objects that are executed as part of a software application on either an embedded or non-embedded computer system such as a digital signal processor (DSP), microcomputer, minicomputer, microprocessor, etc. running a real-time operating system such as WinCE, Symbian, OSE, Embedded LINUX, etc. or non-real time operating system such as Windows, UNIX, LINUX, etc., or as soft core realized HDL circuits embodied in an Application Specific Integrated Circuit (ASIC) or Field Programmable Gate Array (FPGA), or as functionally equivalent discrete hardware components.

There is thus provided in accordance with the invention, a method of coprocessor functionality in a multiprocessor system comprising a plurality of processors coupled to a common bus, the method comprising the steps of initializing one of said processors to have a particular functionality and wherein in response to a received bus transaction comprising one or more parameters, said initialized processor executes said functionality on said one or more parameters.

There is also provided in accordance with the invention, a method for inter-processor communications for a multiprocessor system comprising a plurality of processors coupled to a common bus, the method comprising the steps of assigning one of said processors an identifier and wherein said assigned processor receives a bus transaction comprising one or more parameters.

There is further provided in accordance with the invention, a multiprocessor system with a dynamic coprocessor activation mechanism comprising a plurality of processors coupled to a common bus, means for initializing a processor in said multiprocessor complex to have a particular functionality, means for receiving a coprocessor activation request and means for executing said specific function by said activated processor.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

Figure 1:
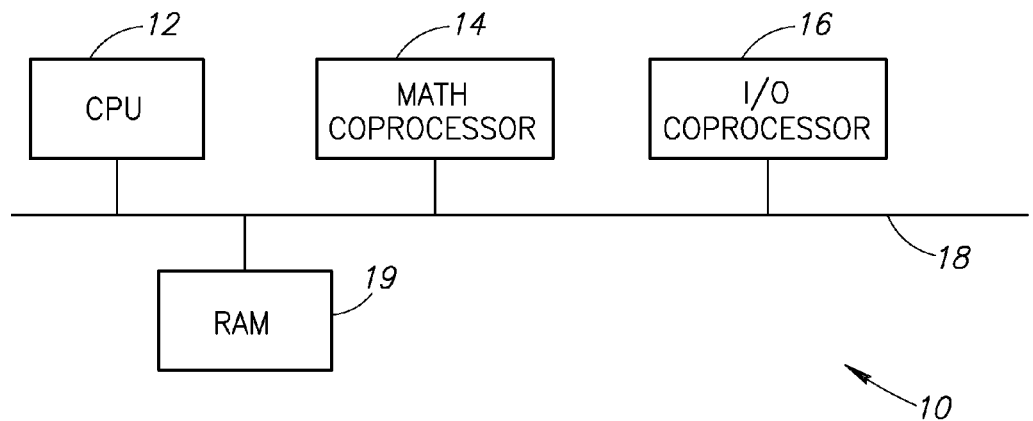
FIG. 1 is a diagram of an example prior art implementation of a computer implementing dedicated hardware coprocessors.

The following notation is used throughout this document:

| Term | Definition |
| --- | --- |
| ASIC | Application Specific Integrated Circuit |
| CPU | Central Processing Unit |
| DSP | Digital Signal Processor |
| FIFO | First-In First-Out |
| FPGA | Field Programmable Gate Array |
| HDL | Hardware Description Language |
| ID | Identifier |
| I/O | Input/Output |
| RAM | Random Access Memory |

DETAILED DESCRIPTION OF THE INVENTION

The present invention provides a solution to the prior art problems discussed hereinabove by providing a processor to processor communication mechanism operative to facilitate inter-processor communication via the transmission and reception of bus transactions between two processors coupled to a common bus. Performance of the processor to processor communication mechanism of the present invention is enhanced by removing the requirement of using inefficient mechanisms such as interrupts in order to facilitate an event request, in this case a coprocessor activation request.

The present invention also provides a coprocessor activation mechanism which enables any processor in a multiprocessor complex to be the target of a coprocessor instruction. All processors in the multiprocessor complex are able to act as either issuers or receivers of coprocessor instructions, accommodating both many-to-many (maintaining isolation and serializability) and asynchronous operations between the processors. The coprocessor activation mechanism of the present invention enables a coprocessor function to be implemented in software, instead of using specialized hardware.

The invention is operative to enhance the performance of multiprocessor systems. Computationally intensive functions can be offloaded to specific processors as needed to take advantage of computers with a multiprocessor architecture. In addition general processor to processor communications will benefit as well.

Coprocessor Activation Method

In accordance with the invention, a main processor (also referred to as an initiator or an issuer) sends a coprocessor activation message (or a pointer to a message) that includes a function tag. The function tag enables one of several execution units (also referred to as targets) that are associated with the tagged function to recognize the message and retrieve the message from the interconnecting bus, execute the function and return a response. Messages can also be retrieved from shared memory if the data retrieved from the interconnecting bus comprises a pointer to the message. The operation of the issuer may be synchronous (i.e. waits for the response), semi-synchronous (i.e. waits for reception acknowledgement) or completely asynchronous (i.e. no wait by the issuer).

In one embodiment of the method of the present invention, the main processor (i.e. the initiator) and coprocessor (i.e. the target) are separate central processing units (CPUs). In an alternative embodiment of the invention, the main processor (i.e. the initiator) and coprocessor (i.e. the target) reside in the same CPU. In another alternative embodiment of the invention, a single CPU hosts a plurality of coprocessors (i.e. targets).

In the coprocessor activation method of the present invention, the issuer is completely unaware of the nature of the target. The target can comprise a main processor, a specialized piece of hardware or another class of processors with different capabilities than the issuer. The symmetry of the mechanism of the present invention allows a wide variety of implementations and execution topologies.

The coprocessor activation message comes from either the user space or the protected kernel space, and the coprocessor function is executed in either the user space or the protected kernel space as well. In addition, isolation needs to be allowed when required. While the sole interaction between issuer and the target comprises the activation message, data referenced by pointers in the activation message is shared by the issuer and target. Sharing data is accomplished by either sharing memory and/or implementing a data mover engine for copying data between issuer and target address spaces.

Figure 2:
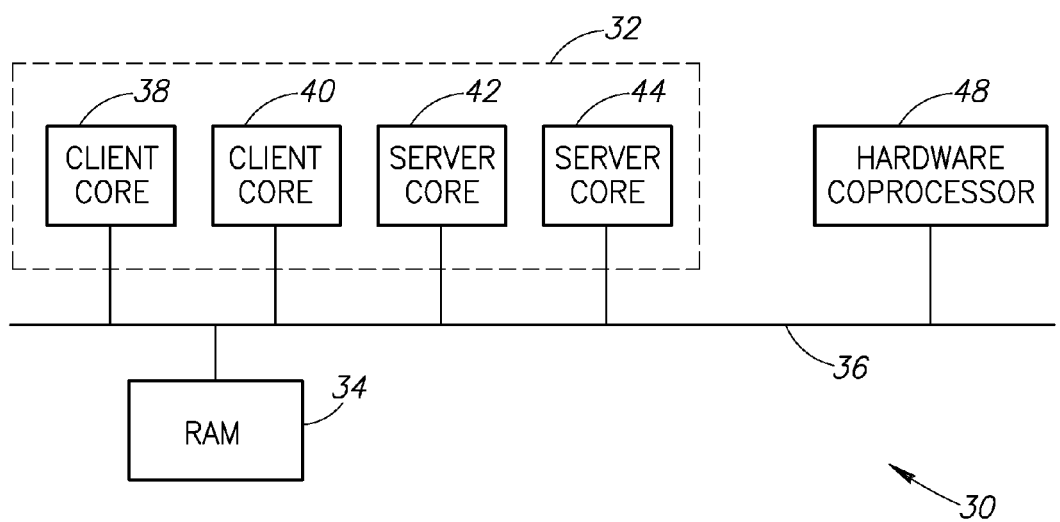
FIG. 2 is a first diagram illustrating the coprocessor functionality activation mechanism of the present invention.

A block diagram showing an implementation of the coprocessor activation mechanism of the present invention is shown in FIG. 2. The circuit, generally referenced 30, comprises multi-core processor 32, random access memory 34, bus 36 and hardware coprocessor 48. Multi-core processor 32 is further comprised of processor cores 38, 40, 42 and 44. In this implementation, application programs are executing on client cores 38 and 40, server core 42 is designated as an encryption coprocessor and server core 44 is designated as a compression coprocessor. Any compression and encryption tasks required by application programs running on processors 38 and 40 are offloaded to the appropriate coprocessor within multi-core processor 32.

Figure 3:
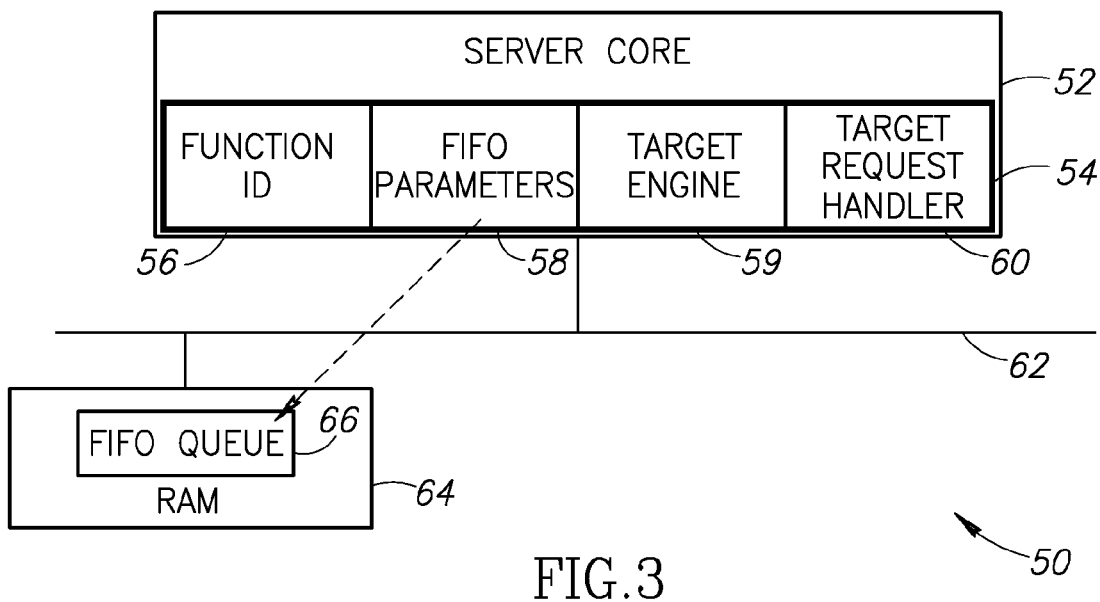
FIG. 3 is a second diagram illustrating the coprocessor functionality activation mechanism of the present invention.

In the circuit shown in FIG. 2, processors 42 and 44 are server core processors executing coprocessor logic. An example of a server core utilized by the present invention is shown in FIG. 3. The circuit, generally referenced 50, comprises server (i.e. CPU) core 52, coprocessor mechanism 54, bus 62, memory 64 and first-in first-out (FIFO) queue 66. Coprocessor mechanism 54 is further comprised of function identifier 56, first-in first-out (FIFO) parameters 58, target engine 59 and target request handler 60. When the coprocessor is initialized using the mechanism of the present invention, a unique identifier is stored in function identifier 56, the location and any parameters (e.g., size) for FIFO queue 66 is stored in FIFO parameters 58 and the coprocessor function logic (i.e. the software necessary to implement coprocessor functionality) is stored in target request handler 60. Target engine 59 is a mechanism which handles all bus interaction.

In operation, target engine 59 monitors bus 62 for a transaction with an identifier matching the value stored in function identifier 56. When a matching transaction is detected, target engine 59 retrieves the transaction from bus 62 and loads the parameters for the coprocessor function call into FIFO queue 66 referenced by FIFO parameters 58.

Target request handler 60 monitors FIFO queue 64 to see if there are any coprocessor operations waiting to be executed. When such an operation is detected in the queue, target request handler 54 loads the necessary coprocessor function call parameters from FIFO queue 66 and executes the coprocessor function on CPU core 52.

Figure 4:
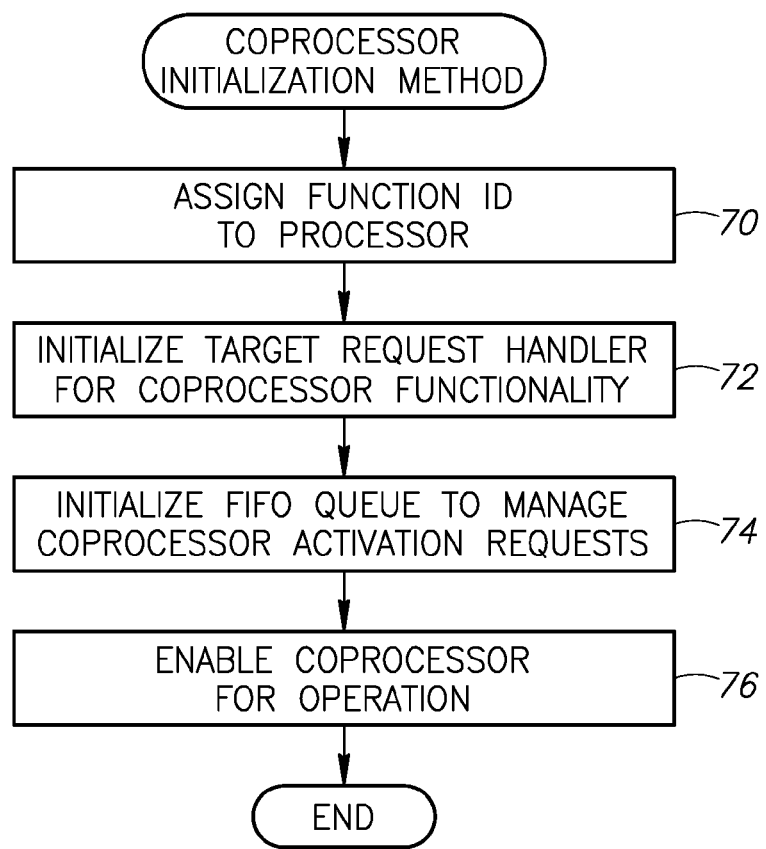
FIG. 4 is a flow diagram illustrating the coprocessor initialization method of the present invention.

A flow diagram illustrating the coprocessor initialization method of the present invention is shown in FIG. 4. First a function identifier is assigned to the CPU (step 70). Next, the target request handler is initialized to implement coprocessor functionality (step 72). The target request handler can comprise computer executable code or a memory address where the computer executable code resides. The computer executable code enables the processor to implement coprocessor functionality, and a FIFO queue is initialized to handle coprocessor activation requests (step 74). Finally, the coprocessor functionality is enabled for operation (step 76). The coprocessor initialization method of the present invention enables a CPU to exhibit coprocessor functionality.

Figure 5:
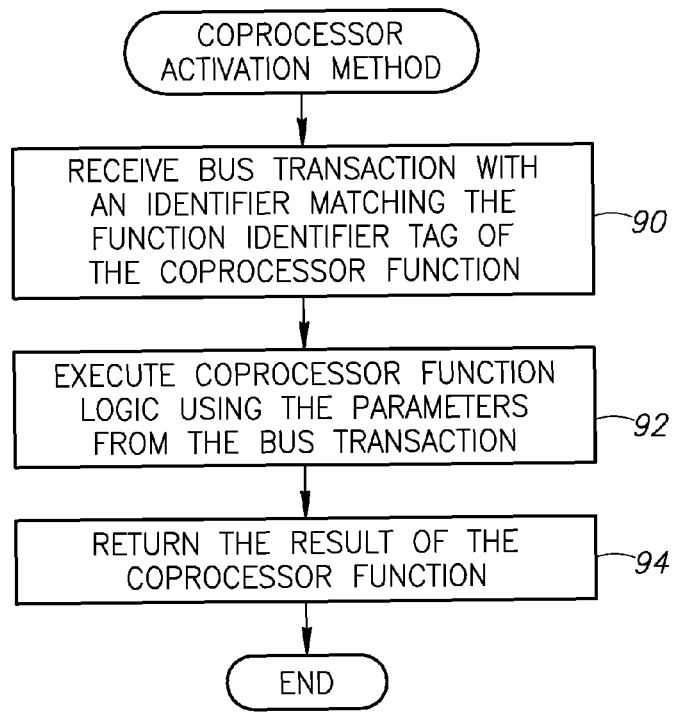
FIG. 5 is a flow diagram illustrating the coprocessor activation method of the present invention.

A flow diagram illustrating the coprocessor activation method of the present invention is shown in FIG. 5. First, the target request handler on the server core running coprocessor logic retrieves a coprocessor activation message with an identifier function matching the function identifier associated with the coprocessor function residing on the server core (step 90). The target request handler executes the coprocessor function with the parameters from the coprocessor activation message (step 92) and the function result is returned (step 94).

Processor to Processor Communication

The coprocessor activation mechanism of the present invention implements a mechanism for inter-processor communication. This inter-processor communication mechanism uses the processor bus to send bus transactions between processors which are coupled to the same bus in a multiprocessor complex. This mechanism adds efficiency by significantly reducing the number of hardware interrupts necessary to activate the coprocessor. In operation, each processor in the multiprocessor complex is assigned a unique identifier. Bus transactions comprise a processor identifier and the message to be sent to the processor. The processors monitor the bus for transactions containing a processor identifier matching the identifier previously assigned to the processor. Once the processor detects a bus transaction with a matching identifier, it possesses the bus transaction.

In one embodiment of the processor to processor communication mechanism of the present invention, a processor is addressed and receives a bus transaction from another processor in the multiprocessor complex. In an alternative embodiment of the processor to processor communication mechanism of the present invention, a processor is addressed and receives a bus transaction from any system device (e.g. an I/O device).

Figure 6:
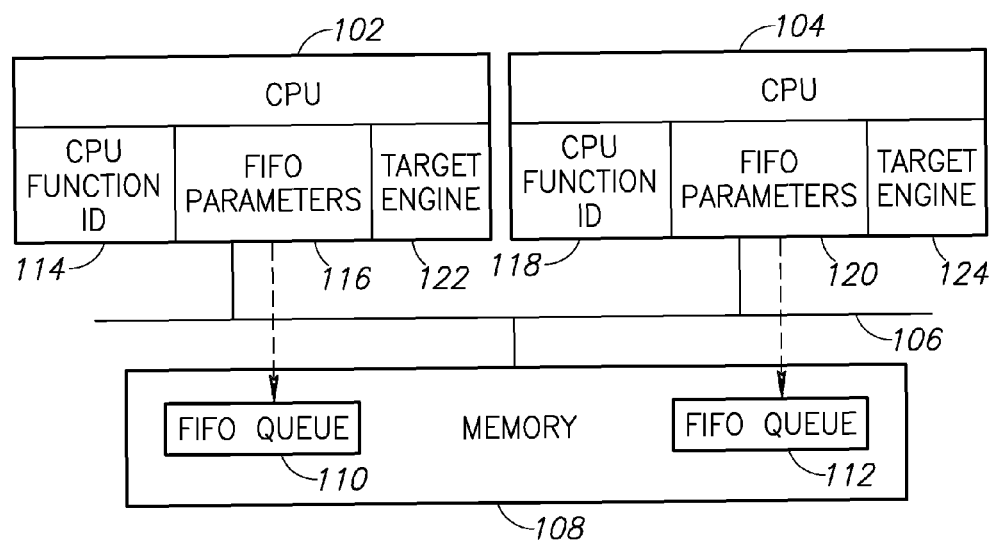
FIG. 6 is a diagram illustrating the processor to processor communications mechanism of the present invention.

A block diagram showing a processor to processor communication mechanism of the present invention is shown in FIG. 6. The circuit, generally referenced 100, comprises central processing units (CPU) 102, 104, processor bus 106, memory 108 and first-in first-out (FIFO) queues 110, 112. CPU 102 is further comprised of CPU function identifier 114, FIFO queue parameters 116 and target engine 122. FIFO queue parameters 116 comprise the location of FIFO queue 110 in memory 108, as well as the size and structure of FIFO queue 110. Target engine 122 handles all bus interaction for CPU 102. CPU 104 is further comprised of CPU function identifier 118, FIFO queue parameters 120 and target engine 124. FIFO queue parameters 118 comprise the location of FIFO queue 112 in memory 108, as well as the size and structure of FIFO queue 112. Target engine 124 handles all bus interaction for CPU 104.

In operation, CPUs 102 and 104 are initialized with unique CPU identifiers and FIFO queues. For CPU 104 to receive a message from CPU 102, target engine 124 monitors bus 106 for a bus transaction with an identifier matching the value initialized in CPU function identifier 118. The value assigned to CPU function identifier 118 identifies the CPU to the entire system. Once target engine 124 identifies a matching bus transaction, target handler 104 retrieves the bus transaction and loads the received parameters (of the bus transaction) to FIFO queue 112. The message parameters are then retrieved from FIFO queue 112 and processed by CPU 104.

Figure 7:
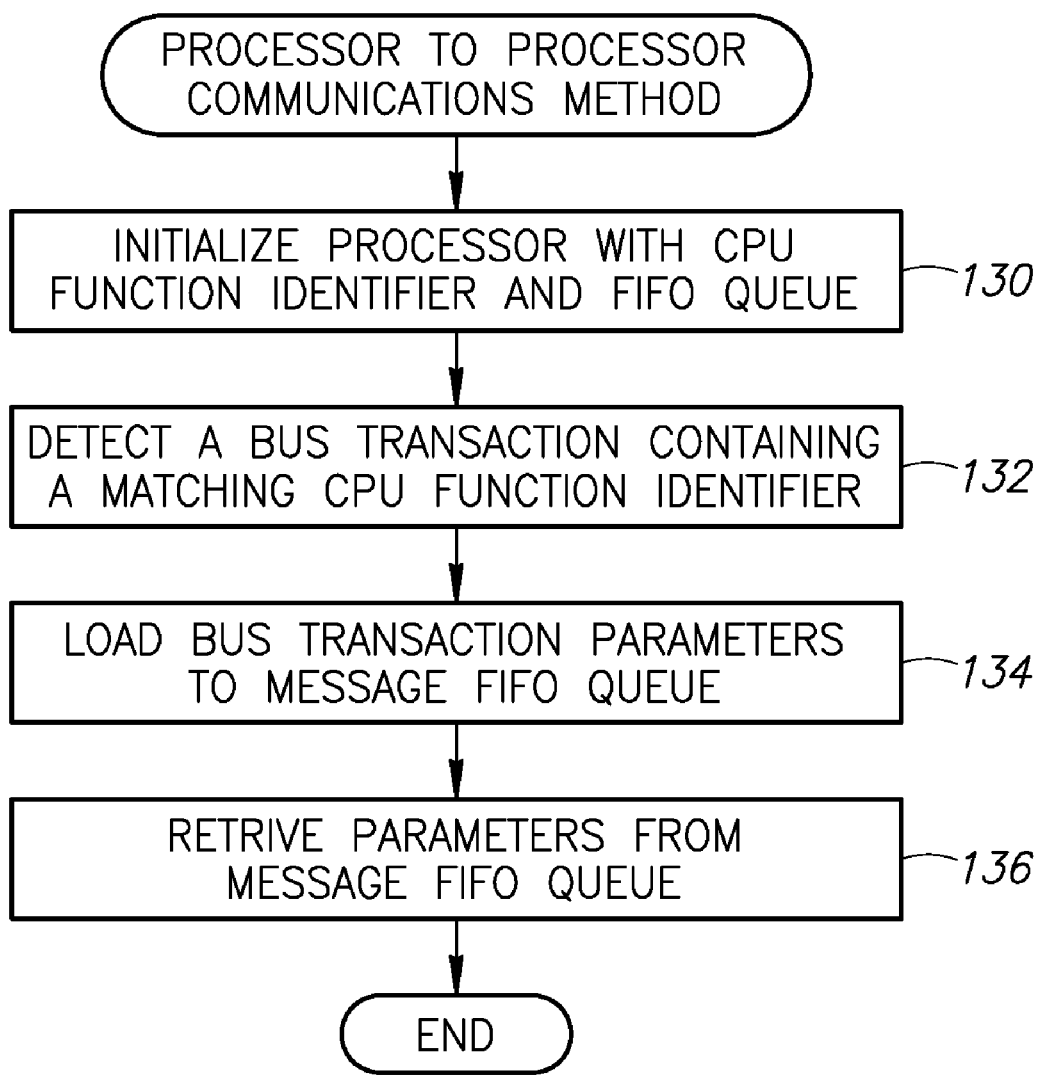
FIG. 7 is a flow diagram illustrating the processor to processor communications method of the present invention.

A flow diagram illustrating the processor to processor communication method is shown in FIG. 7. The processor is first initialized with both a CPU function identifier and a FIFO queue to store received messages (step 130). Next, a bus transaction is detected with a matching CPU function identifier (step 132). The bus transaction parameters (i.e. the message targeted for the processor) are loaded into the processor's first-in first-out message queue (step 134), and finally the processor retrieves and processes the parameters from the queue (step 136).

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A method of coprocessor functionality in a multiprocessor system comprising a plurality of processors coupled to a common bus, said method comprising the steps of:

sending an activation message from an initiator processor comprising a function identification (FID) tag to a target processor in communication with said initiator processor via said bus;

issuing a bus transaction by said initiator processor comprising the FID of said target processor;

first monitoring said bus by said target processor for the presence of an FID corresponding thereto, and if a match is detected, retrieving parameters for a function call related to said FID and storing them in a first-in first-out (FIFO) queue; and second monitoring said FIFO queue by said target processor for operations to be executed, and if at least one operation is found, loading one or more function call parameters from said FIFO queue and executing said function call on said target processor.

2. The method according to claim 1, wherein said step of sending further comprises the steps of:
- assigning a function identifier to said initialized processor;
- coupling said initialized processor to computer executable code to execute said functionality; and
- creating a first-in first-out queue to store one or more requests for said coprocessor functionality.

3. The method according to claim 1, wherein said received bus transaction is received from any device coupled to said common bus.

4. The method according to claim 1, wherein one of said one or more parameters in said received bus transaction comprises a function identifier.

5. The method according to claim 4, wherein said function identifier contained in said bus transaction and an identifier assigned to said initialized processor are equivalent.

6. The method according to claim 1, further comprising said target processor returning a function result to said initiator processor.

7. The method according to claim 1, wherein said step of executing further comprises the steps of:
- retrieving said one or more parameters from a first-in first-out queue;
- executing said coprocessor functionality on said one or more parameters; and
- returning the result of said coprocessor functionality.

8. A method for inter-processor communications for a multiprocessor system comprising a plurality of processors coupled to a common bus, said method comprising the steps of:
- assigning each processor in said multiprocessor system a unique process identifier;
- issuing one or more bus transactions comprising a processor identifier and a message;
- monitoring, by each processor, said bus for transactions comprising a processor identifier matching a processor identifier previously assigned thereto;
- if a matching processor identifier is detected, retrieving said bus transaction and storing corresponding bus transaction parameters in a first-in first-out (FIFO) queue; and
- retrieving and processing said bus transaction parameters from said FIFO queue.

9. The method according to claim 8, wherein said bus transaction is received from any processor coupled to said common bus.

10. The method according to claim 8, wherein one of said one or more parameters in said received bus transaction comprises a function identifier.

11. The method according to claim 10, wherein said function identifier contained in said bus transaction and an identifier assigned to said initialized processor are equivalent.

12. A multiprocessor system with a dynamic coprocessor activation mechanism comprising:
- a plurality of processors coupled to a common bus, including an initiator processor and a target processor;
- means for initializing a processor in said multiprocessor system to have a particular functionality by sending a processor activation message comprising a function identification (FID) tag to a target processor over said bus;
- means for receiving said processor activation message and configuring said target processor in accordance thereto;
- means for issuing, by said initiator processor, a bus transaction comprising the FID of said target processor;
- first means for monitoring, by said target processor, said bus for the presence of its FID, and if a match is detected, retrieving parameters for a function call related to said FID and storing them in a first-in first-out (FIFO) queue; and
- second means for monitoring, by said target processor, said FIFO queue for operations to be executed, and if at least one operation is found, loading one or more function call parameters from said FIFO queue and executing said function call on said target processor.

13. The method according to claim 12, wherein said means for initializing further comprises:
- means for assigning a function identifier to said initialized processor;
- means for coupling said initialized processor to computer executable code to execute said functionality; and
- means for creating a first-in first-out queue to store one or more requests for said coprocessor functionality.

14. The system according to claim 12, wherein said processor activation message is received from any device coupled to said common bus.

15. The system according to claim 12, wherein one of said one or more parameters in said processor activation message comprises a function identifier.

16. The system according to claim 12, wherein said function identifier assigned to said initialized processor and an identifier contained in said processor activation message are equivalent.

17. The system according to claim 12, wherein said means for receiving a processor activation message further comprises:
- means for retrieving parameters from said coprocessor activation request; and
- means for storing said parameters in a first-in first-out queue.

18. The method according to claim 17, wherein said processor activation message comprises a bus transaction.

19. The system according to claim 12, wherein said first-in first-out queue stores one or more processor activation messages.

20. The system according to claim 12, wherein said means for executing further comprises the steps of:
- means for retrieving said one or more parameters from a first-in first-out queue;
- means for executing said coprocessor functionality on said one or more parameters; and
- means for returning the result of said coprocessor functionality.

* * * * *